Patented June 21, 1932

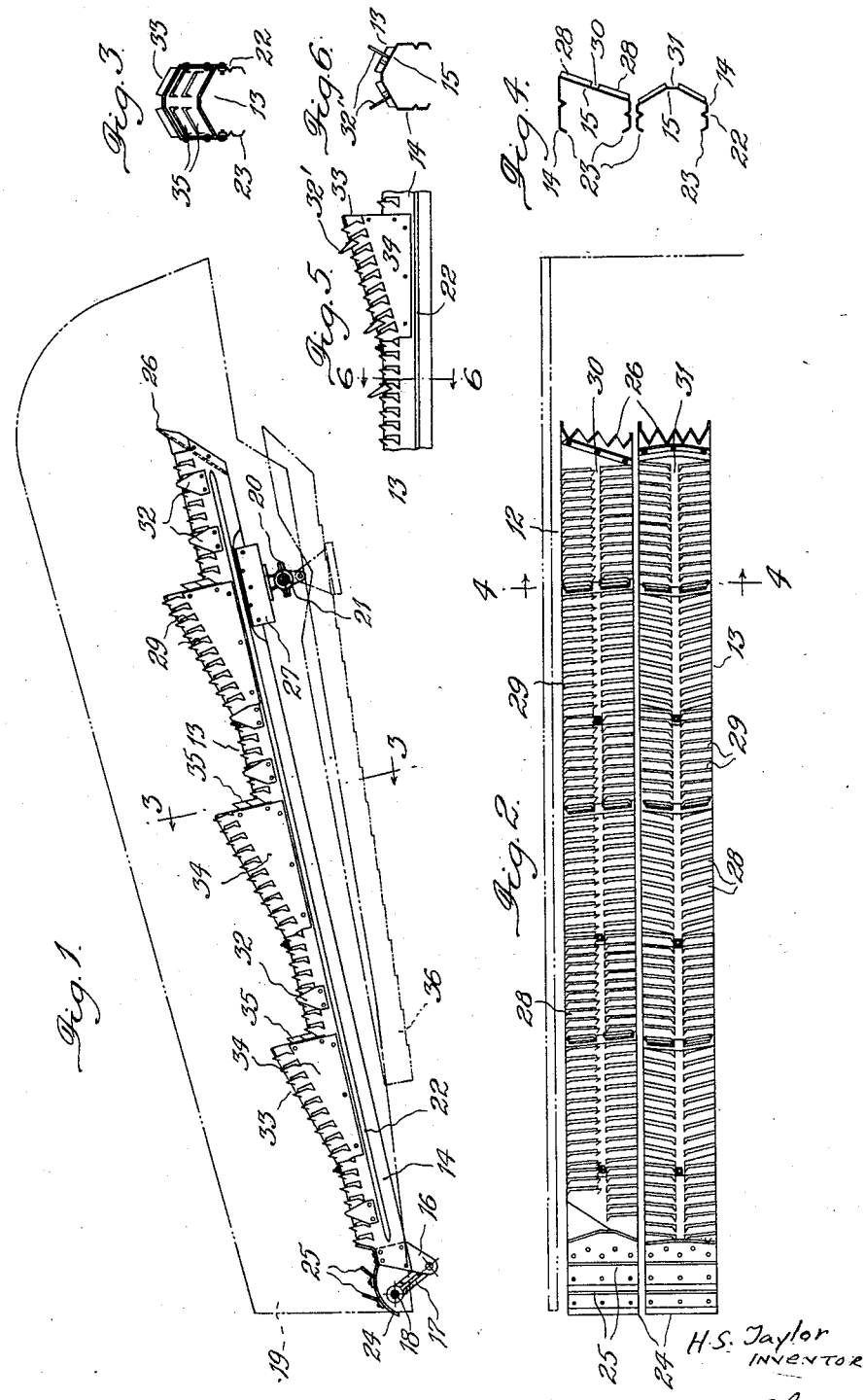

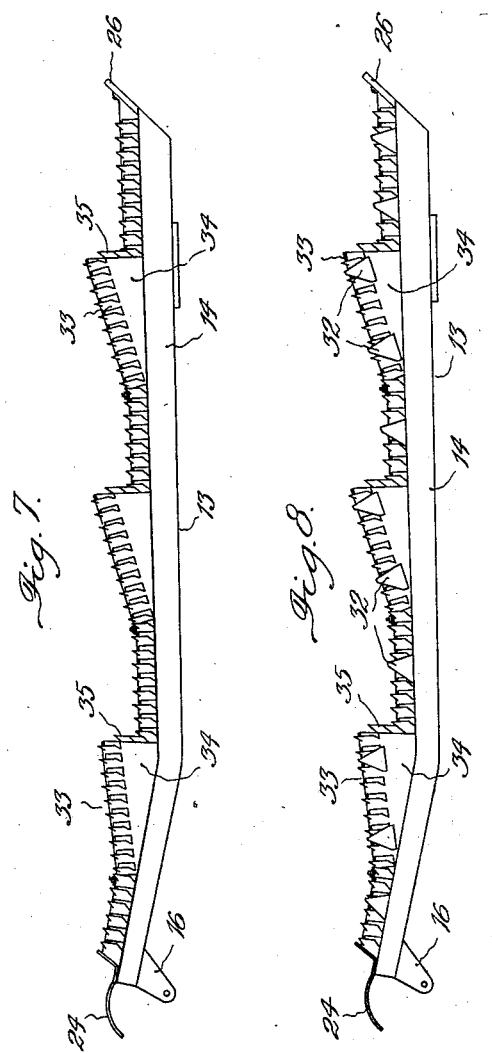

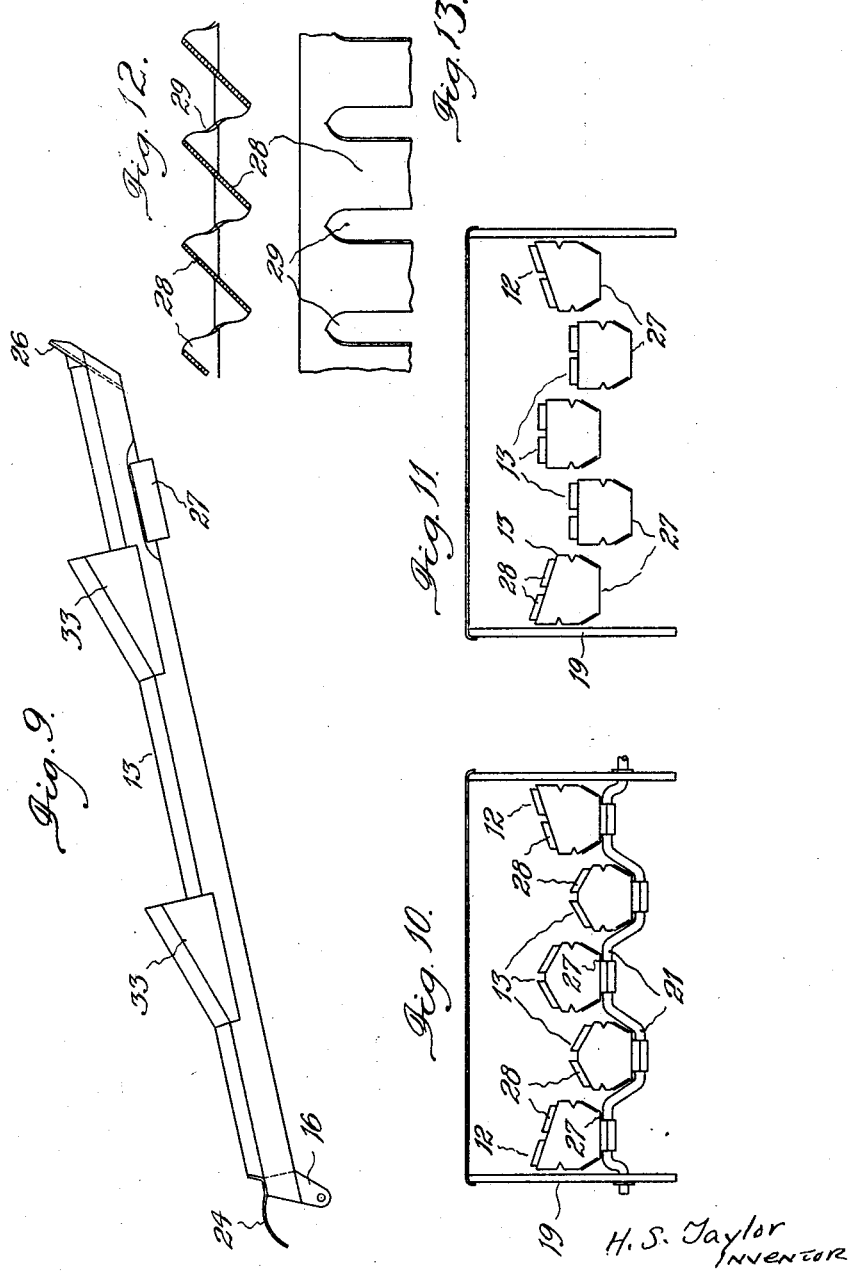

1,864,005

UNITED STATES PATENT OFFICE

HEADLIE SHIPARD TAYLOR, OF SUNSHINE, VICTORIA, AUSTRALIA, ASSIGNOR TO H. V. McKAY PROPRIETARY LIMITED, OF SUNSHINE, AUSTRALIA

STRAW WALKER

Application filed March 5, 1930, Serial No. 433,479, and in Australia March 15, 1929.

This invention relates to improvements in straw walkers of reaper thresher and like harvesting machines, and refers especially to straw walkers of the type comprising a series of parallelly arranged sections reciprocatingly mounted above a winnower for pitching and bumping the threshed straw in a longitudinal direction whereby it will be opened up to permit clean grain and unthreshed heads to gravitate therethrough and pass to the winnower prior to the straw being ejected from the rear end thereof.

It is customary to construct the straw walker sections with side members of wood having their upper edges connected by horizontal cross slats or louvres of wood or metal shaped to facilitate the rearward movement of the straw and spaced apart to permit the passage therebetween of grain and unthreshed heads. The inner ends of the straw walker sections are suspended or supported on pivoted links or cranks near the throat of the thresher and their outer ends are supported on a driven crank shaft which imparts motion to the same.

The disadvantage experienced with the above type of straw walker is the difficulty in handling large quantities of straw in that it failed to distribute it evenly and open it up sufficiently to permit the free separation of all the grain therefrom.

Now the object of the present invention is to provide a simple, light and durably constructed straw walker wherein the parts are so constructed and arranged that a maximum separating area is provided in a given size of walker and a more effectual tossing or bumping movement is imparted to the straw whereby an effectual separation of the grain and heads therefrom is accomplished when handling large quantities of material.

I accomplish the above mentioned object by arranging the upper surfaces of the straw walker sections at transverse inclinations whereby a greater separating area is provided and the straw will be moved longitudinally and laterally and thereby transverse a sinuous path in passing over the straw walker.

The upper surfaces of the outer straw walker sections of the series are arranged at an inward and downward inclination with one or more rows of transversely disposed louvres thereon, and the upper surfaces of the straw walker sections disposed between the two outer sections are formed gable shaped in cross section with transversely disposed louvres arranged on the oppositely disposed inclined surfaces thereof.

In order that the invention, the object and nature of which have been set forth, may be readily understood, reference will now be had to the accompanying sheet of explanatory drawings wherein:—

Figure 1 is a view in elevation of portion of a straw walker constructed in accordance with the invention.

Figure 2 is a view in plan of an outer straw walker section and an adjacent intermediate straw walker section, the other sections being removed for convenience of illustration.

Figure 3 is a view in sectional end elevation taken on the dotted line 3—3 of Figure 1.

Figure 4 is a view in sectional end elevation taken on the dotted line 4—4 of Figure 2.

Figure 5 is a view in side elevation of portion of an intermediate straw walker section showing a slight modification of the invention.

Figure 6 is a view in sectional end elevation taken on the dotted line 6—6 of Figure 5.

Figures 7 and 8 are views showing the invention adapted to a modified type of straw walker section.

Figure 9 is a diagrammatic view illustrating a further modification in the arrangement of the parts of the invention.

Figure 10 is a view in sectional end elevation of a complete assemblage of straw walker sections constructed in accordance with the present invention.

Figure 11 is a view similar to Figure 10 showing a slight modification of the invention.

Figures 12 and 13 are views in longitudinal section and plan of portion of one of the straw walker sections and shows a modified form of louvre.

In these drawings where like characters of reference have been employed to indicate the same or corresponding parts in the different views, the numeral 12 designates an outer section and the numeral 13 an adjacent intermediate section of the straw walker.

The straw walker sections illustrated in Figures 1 to 6 of the drawings are shaped from sheet metal with the side members 14 and top portions 15 formed integrally with each other.

The front ends of the straw walker sections or those ends which are adapted to receive threshed straw are provided with depending lugs 16 which are connected to supporting links 17 secured to a spindle 18 passing transversely through the straw walker casing 19.

The undersides of the delivery ends of the straw walker sections are provided with bearings 20 for accommodating cranks 21 on a shaft rotatively mounted in the straw walker casing and the rotation of the said crank shaft is adapted to impart a reciprocating motion to the sections in the ordinary way.

When the sides 14 of the straw walker sections are formed of sheet metal they may be provided with longitudinal flutings 22 to reinforce and give a desired degree of rigidity to the same, and the lower edges of the said sides may be flanged inwardly, as at 23, to further stiffen the construction.

The receiving ends of the straw walker sections are provided with curved extensions 24 which are adapted to extend above the transverse spindle 18 and form a hood or cover for preventing straw and threshed material passing downwardly in advance of the said sections.

The curved extension may be provided with rearwardly inclined lips 25 to facilitate the rearward passage of threshed straw falling thereon. The rear or discharge ends of the straw walker sections may be provided with upwardly extending rakes 26 constructed as illustrated in the drawings or in any well known way.

The bearings 20 are fitted to U-shaped brackets 27 which are secured by rivets or in any other approved way to the sides of the straw walker sections, and the sides, at this point, may be bent inwardly to provide sufficient clearance for the cranks supporting the discharge ends of the said sections, see Figures 1, 10 and 11.

The top of each outer straw walker section inclines inwardly and downwardly at a suitable angle, (see Figures 4, 10 and 11), and punched out of the metal forming the same are series of louvres 28. The louvres incline upwardly from the front edges of openings 29 and towards the discharge end of the straw walker section, as shown in Figures 1 to 11 of the drawings, or they may be formed as shown in Figure 12 of the drawings.

The louvres 28 may be formed in two rows each extending approximately half the width of the top of the section and uniting with a plain longitudinal strip 30 extending along the centre thereof or the said louvres may extend the full width of the said top as preferred.

The top of each intermediate straw walker section that is, those sections disposed between the two outer sections, is made in the form of a gable (when viewed in cross section) and louvres 28 are punched from the oppositely inclined portions thereof. The two rows of louvres in the oppositely inclined upper surfaces of the intermediate sections of the straw walker may be shaped as illustrated in Figures 1 and 2 or as shown in Figure 12 of the drawings and may be connected by a plain longitudinal strip 31. If preferred, the louvres 28 may extend the full width of the outer and intermediate sections. The straw walker sections may be made straight and they may be supported horizontally or at an inclination, as preferred.

A series of grips 32 of ratchet tooth formation may be fitted to the sides of the straw walker sections and arranged to project above the louvres on the top thereof and these projections facilitate the passage of the straw thereover.

Each straw walker section may be provided with one or more ramp portions 33, the upper surfaces of which are inclined transversely to conform to the shape of the respective sections to which they are secured, that is to say, the upper surfaces incline in the same direction as the top of the outer sections or are ridged longitudinally in the same way as the top of each intermediate section.

The inclined ramp portions may be stamped out of sheet metal with depending side flanges 34 which are secured by rivets or in any other approved manner to the sides of the straw walker sections and the tops and the rear vertical ends of the inclined portions are provided with louvres 35 of approved construction.

The vertical ends provided with the louvres 35 may be formed separately from the ramp portions and be riveted thereto as indicated in Figures 1 and 3 of the drawings. The ramp members 33 when two or more are used as shown in Figures 9 and 1 respectively, can be arranged at any suitable distance apart and be disposed in approved positions.

When the sections of the straw walker are adapted to be fitted with ramp members 33 their upper surfaces are cut away at those points which will be located beneath the said ramp members whereby the material passing through the openings between the louvres of the ramp members will pass direct to the cleaning mechanism of a winnower (not shown) or to a shaking tray 36 situated thereabove.

If preferred grips as 32 may be fitted to the sides of the ramp portions 33 as indicated in Figures 5, 6, and 8 of the drawings. In the first mentioned figures, grips 32' are shown affixed to the oppositely inclined top portions of the intermediate sections of the walker between the louvres and they may be arranged in a like manner between the louvres on the outer straw walker sections.

In Figures 7 and 8 of the drawings the forward ends of the straw walker sections are arranged at an angle to their rear portions and the sides of the sections are shown formed of wood.

Whilst I have shown in the drawings two forms of louvres which are shaped integrally with the tops of the straw walker sections, I wish it to be understood that the particular shape of the louvre does not form an essential part of the invention as providing they are constructed and arranged in accordance with general practice they will be more or less efficient in use.

In lieu of providing the intermediate sections of the straw walker with gable shaped upper surfaces as indicated in Figures 1 to 6 they may be made flat and the outer sections only may be given a transverse inclination as shown in Figure 11. Whilst this form of construction will not provide as great a cleaning area as the form shown in Figure 10 the inclinations of the upper surfaces of the outer sections will serve to prevent the straw banking up against the sides of the straw walker casing.

Straw walker sections having their upper surfaces formed as hereinbefore described provide a greater separating or cleaning surface than in cases where louvres are arranged horizontally between the side members and in operation the inclined upper surfaces ensure the straw being opened up to a greater extent than is possible with existing constructions.

The transversely inclined upper surfaces of the straw walker sections moreover ensures the grain and heads passing through the spaces between the louvres with greater facility and the straw to be moved rearwardly more or less in a sinuous path over the sections owing to the inclined surfaces tending to throw the straw in a lateral as well as in a longitudinal direction.

The ramp portions 33 and the grips 32 and 32' facilitate the opening up and passage of the threshed straw over the straw walker. Straw walker sections made entirely of sheet metal as above described provide a maximum cleaning or separating surface, can be economically manufactured and are light and durable in construction.

It will be obvious that the side members of the straw walker section can be made of wood and that the louvred top portion can be formed of sheet metal and secured to the side members in any approved way. It will likewise be obvious that various modifications and alterations may be made in the construction and arrangement of the parts of the straw walker sections without departing from the spirit and scope of the invention.

I claim:—

1. A straw walker comprising a series of longitudinally disposed and parallelly arranged reciprocatingly mounted sections, and louvres on the tops of the sections having their upper surfaces so shaped in transverse section that the straw will be moved longitudinally and laterally in passing thereover.

2. A straw walker comprising a series of parallelly arranged reciprocatingly mounted sections, and louvres on the tops of the sections having their upper surfaces inclined transversely whereby the straw will be moved longitudinally and laterally and thereby traverse a sinuous path in passing thereover.

3. A straw walker comprising a series of parallelly arranged reciprocatingly mounted sections, and transversely disposed louvres on the tops of the sections, the louvres on the outer sections having their upper surfaces inclined in an inward and downward direction.

4. A straw walker comprising a series of reciprocatingly mounted sections, transversely disposed louvres on the tops of the outer sections having their upper surfaces inclined inwardly and downwardly, and transverse louvres on the top of the intermediate sections having their upper surfaces gable shaped in cross section.

5. A straw walker comprising a series of parallelly arranged and reciprocatingly mounted sections the outer sections having their upper surfaces provided with a series of transverse louvres inclining downwardly from their outer to their inner edges and the upper surfaces of the intermediate sections are provided with series of transverse inclining downwardly from the centres to the sides thereof.

6. A straw walker comprising a series of parallelly arranged and reciprocatingly mounted sections having transversely inclined upper surfaces provided with series of louvres thereon, said sections having rearwardly and upwardly inclined ramp portions provided with louvres on their upper surfaces and on their rear ends.

7. A straw walker according to claim 4, wherein the upper surfaces of the straw walker sections are provided with upwardly and rearwardly inclined ramp portions having louvres disposed transversely thereon, the upper surfaces of said ramp portions having the same transverse inclination as the upper surfaces of the sections to which they are applied.

8. A straw walker according to claim 4, wherein the inner ends of the series of louvres formed on the oppositely inclined upper surfaces of the intermediate sections are connected by a plain longitudinal strip of material.

9. A straw walker according to claim 4, wherein a series of upwardly projecting grips are secured to the transversely inclined upper surfaces of the sections of the walkers and between the louvres thereon.

10. A straw walker comprising a series of parallelly arranged and reciprocatingly mounted sections movably supported at their ends, the outermost sections having their upper surfaces inclined transversely in an inward and downward direction and the upper surfaces of the intermediate sections inclining transversely from the centres to the sides thereof, series of transverse openings in the inclined upper surfaces of the sections, and a series of upwardly projecting feeding members on the upper surfaces of the sections.

In witness whereof I hereunto affix my signature.

HEADLIE SHIPARD TAYLOR.